G. A. OVERSTROM.
CONCENTRATING TABLE.
APPLICATION FILED JAN. 13, 1903.
1,026,764.
Patented May 21, 1912.
5 SHEETS—SHEET 1.
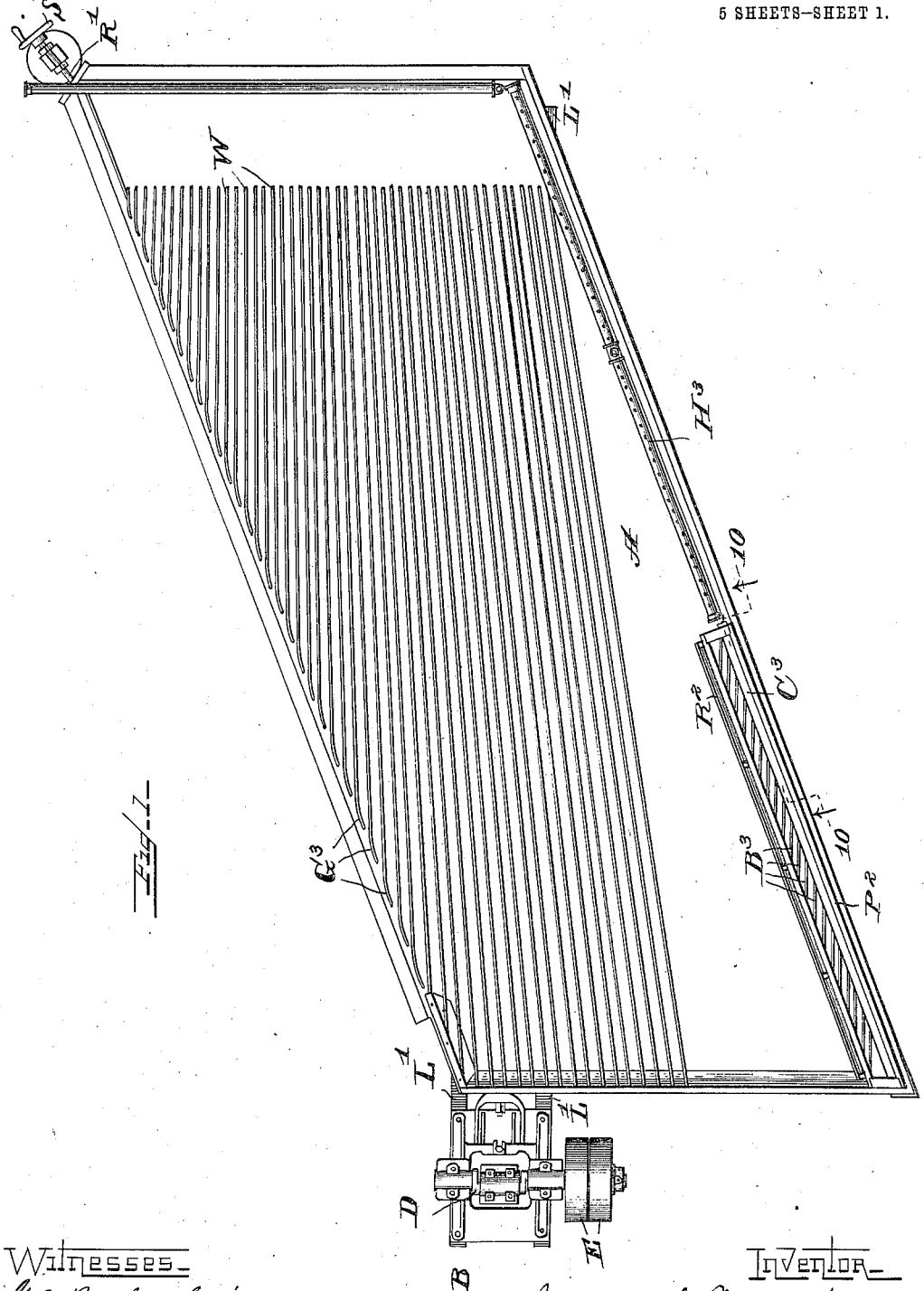

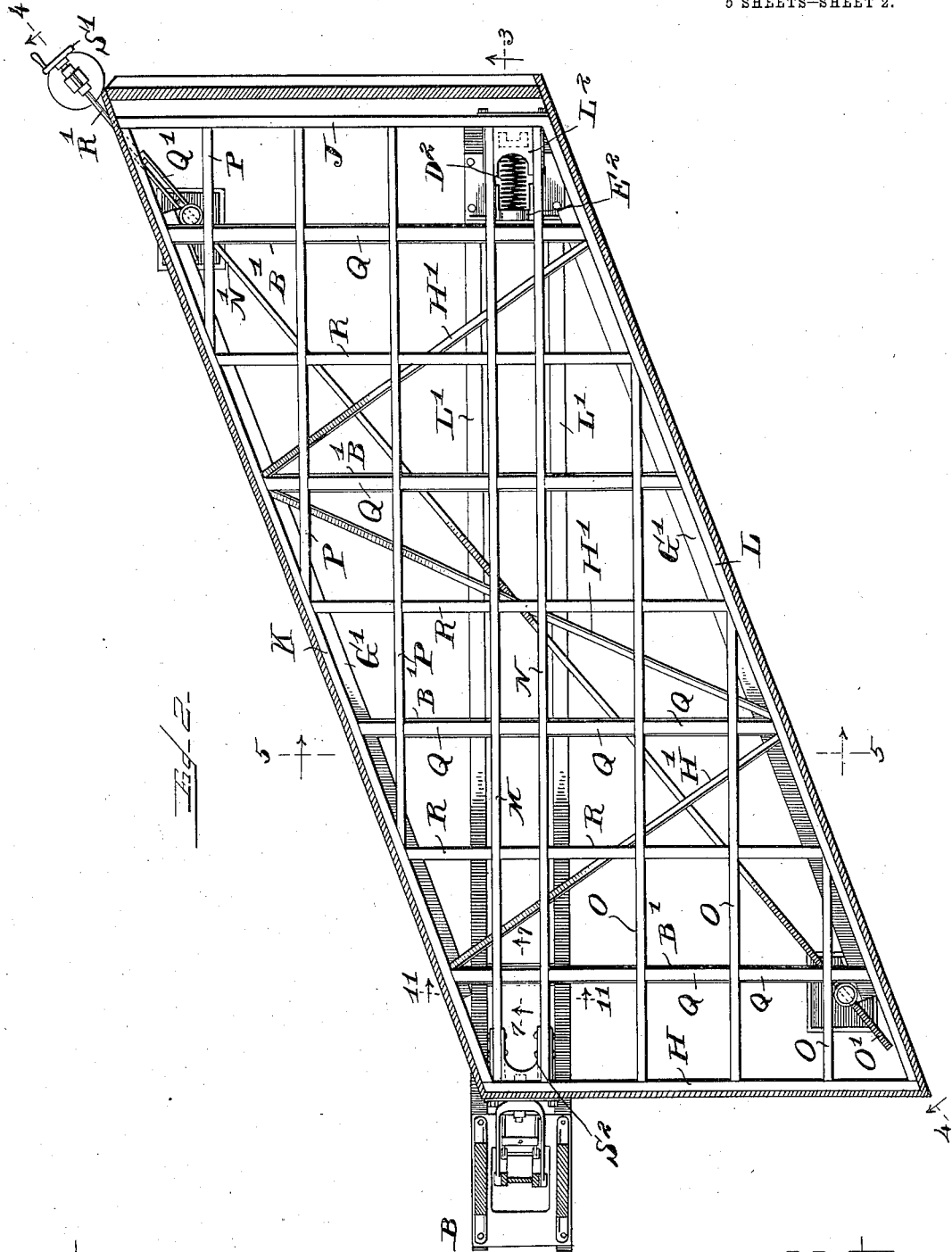

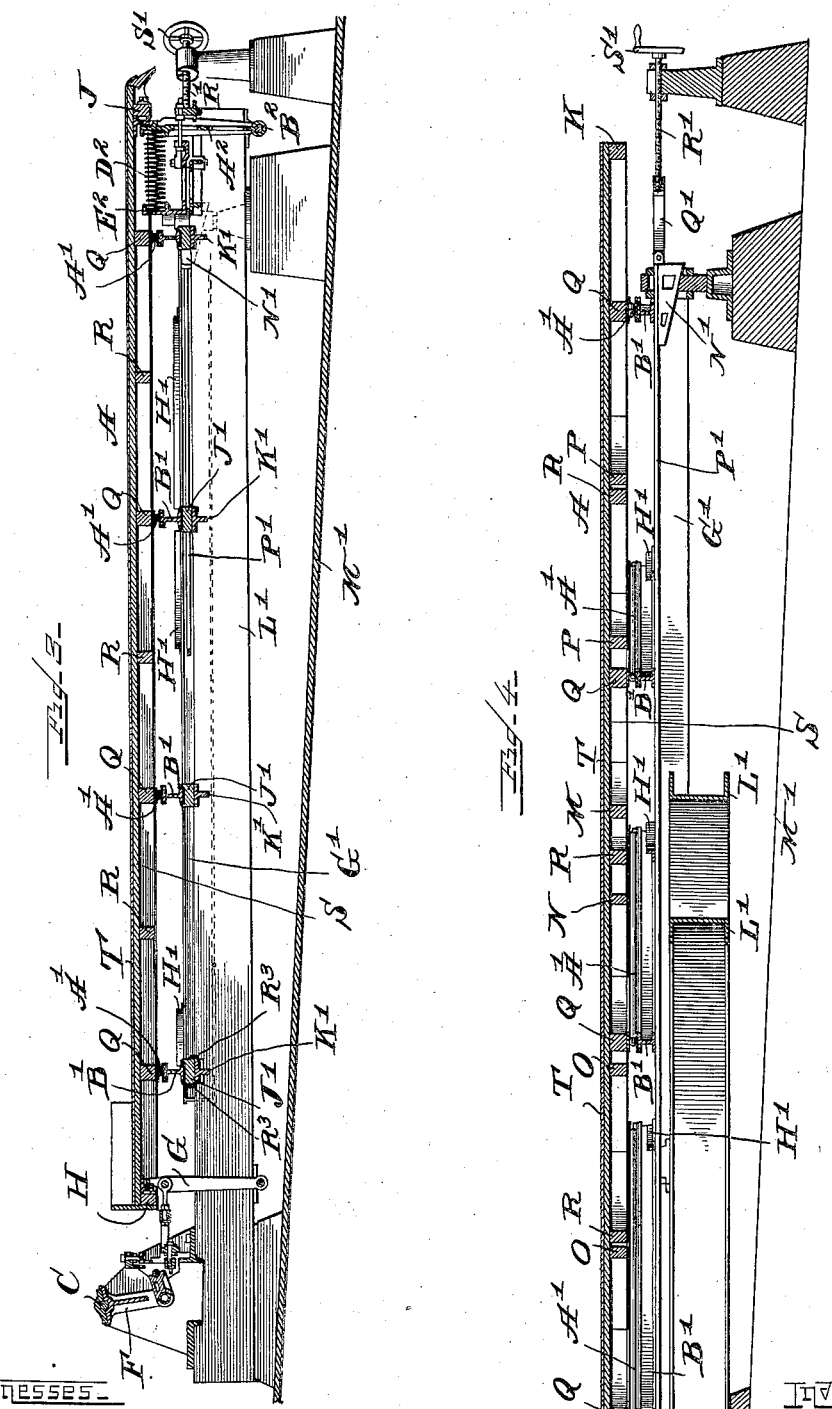

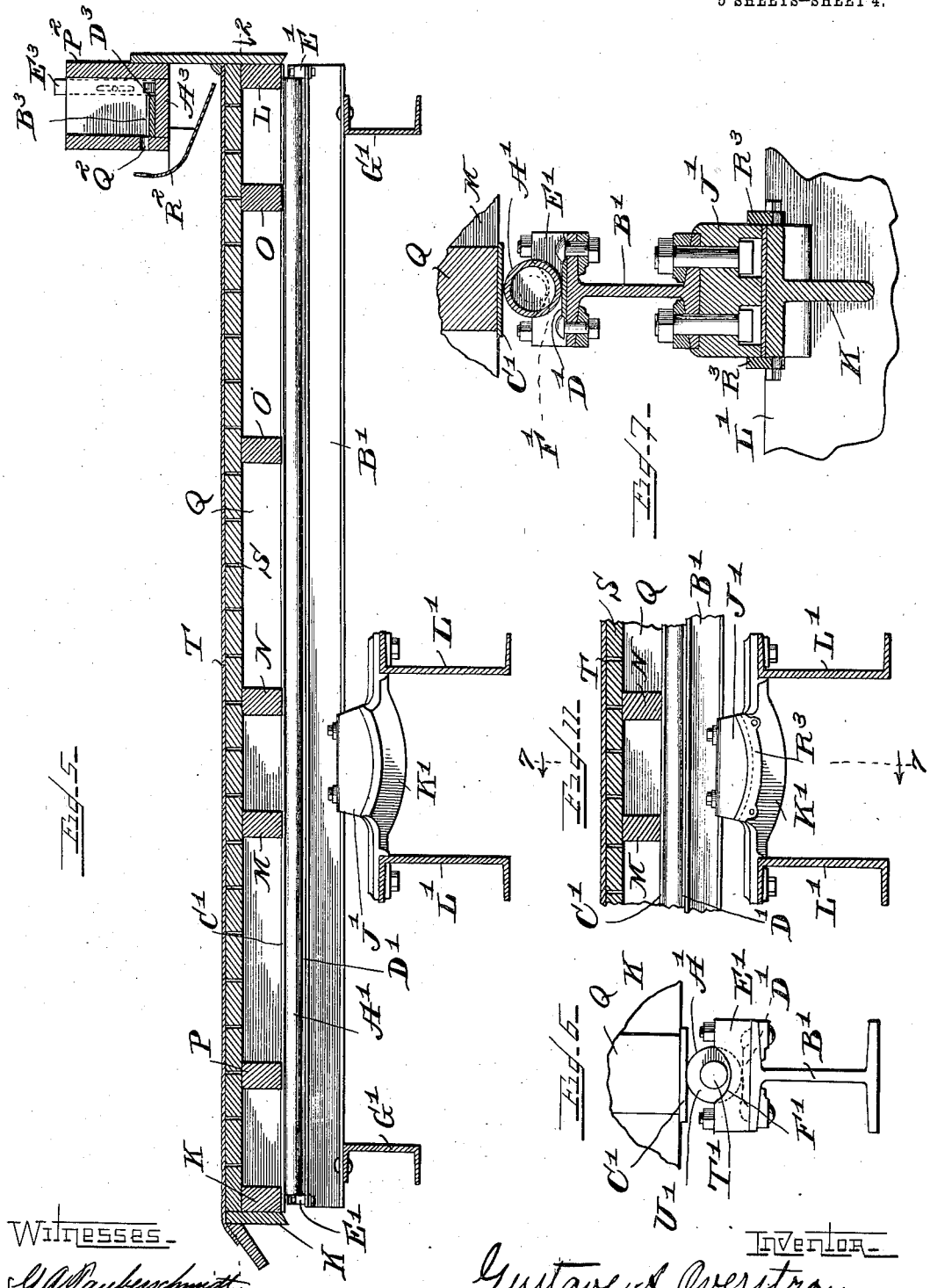

G. A. OVERSTROM.
CONCENTRATING TABLE.
APPLICATION FILED JAN. 13, 1903.
1,026,764.
Patented May 21, 1912.
5 SHEETS—SHEET 5.
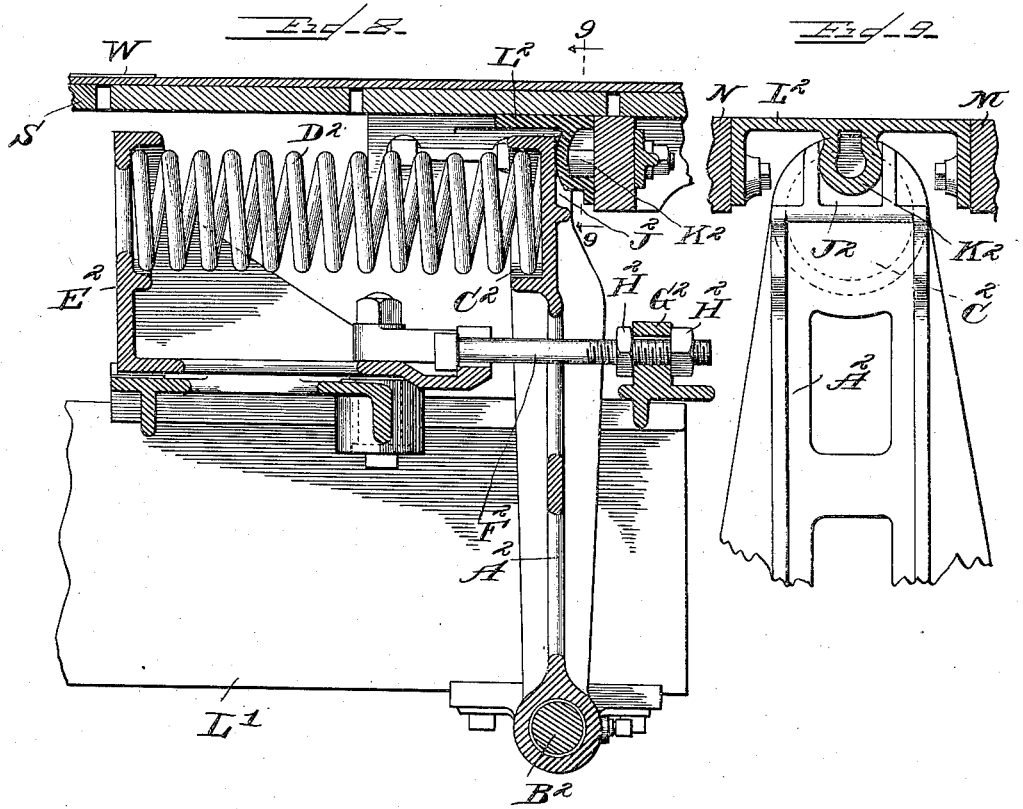
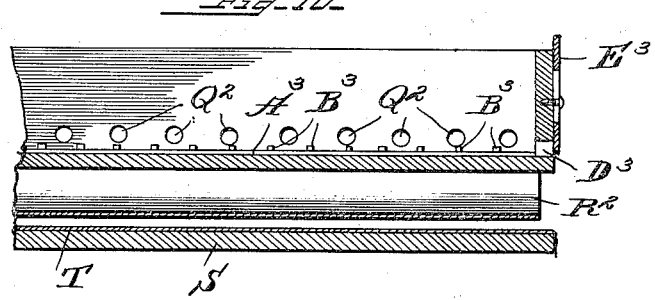

though the UNITED STATES PATENT OFFICE.

GUSTAVE A. OVERSTROM, OF CHICAGO, ILLINOIS, ASSIGNOR TO OVERSTROM CONCENTRATOR COMPANY, OF BUTTE, MONTANA, A CORPORATION OF MONTANA.

CONCENTRATING-TABLE.

1,026,764.   Specification of Letters Patent.   Patented May 21, 1912.

Application filed January 13, 1903. Serial No. 138,935.

*To all whom it may concern:*

Be it known that I, GUSTAVE A. OVERSTROM, a citizen of the United States, residing at Chicago, in the county of Cook and State of Illinois, have invented a new and useful Concentrating-Table, of which the following is a specification.

This invention relates to concentrating tables.

The object of the invention is to provide a construction and arrangement of concentrating tables for ores, minerals, and the like, which is simple and efficient.

A further object of the invention is to provide means whereby a constant tension is maintained on the table, whereby the parts of the frame of the table are prevented from working loose during its operation.

A further object of the invention is to provide means which are simple and efficient for adjusting the angle of inclination of the table surface.

Other objects of the invention will appear more fully hereinafter.

The invention consists substantially in the construction, combination, location and arrangement of parts, all as will be more fully hereinafter set forth, as shown in the accompanying drawings, and finally pointed out in the appended claims.

Referring to the accompanying drawings, and to the various views and reference signs appearing thereon,—Figure 1 is a view in top plan of a concentrating table embodying the principles of my invention. Fig. 2 is a view similar to Fig. 1, with the table top removed and showing the framework of the table, the sides and ends being in horizontal section on the line 2, 2, Fig. 5, looking in the direction of the arrows. Fig. 3, is a view in vertical section on the line 3, 3, Fig. 2, looking in the direction of the arrows. Fig. 4 is a view in section taken diagonally of the table on the line 4, 4, of Fig. 2, looking in the direction of the arrows. Fig. 5 is a view in transverse section on the line 5, 5, Fig. 2, looking in the direction of the arrows. Fig. 6 is a broken detail view in end elevation looking from the left of Fig. 5, and showing the end of a supporting roller of the table. Fig. 7 is a broken detail view in section on the line 7, 7, of Fig. 11. Fig. 8 is a view in section on the same plane as Fig. 3, through the table tension mechanism, the parts being shown somewhat enlarged. Fig. 9 is a broken detail view in section on the line 9, 9, of Fig. 8, looking in the direction of the arrows. Fig. 10 is a broken detail view in section on the line 10, 10, of Fig. 1, looking in the direction of the arrows. Fig. 11 is a broken detail view in transverse section on the line 11, 11, Fig. 2, looking in the direction of the arrows.

The same reference sign is employed throughout the several views of the drawing to designate the same part.

While my invention in some of the specific details thereof is applicable for use generally in ore concentrating machines or tables, I have shown and will now describe the same in the application thereof to an ore concentrating table of the type employing riffles arranged upon the upper surface of the table, and wherein reciprocations or reciprocatory movements are imparted to the table in a line substantially diagonal with respect to the table surface, the riffles being arranged in lines substantially parallel with the line of reciprocatory movements imparted to the table. In the operation of a concentrating table of the type referred to the crushed ore is fed to the table surface from a feed-box, into which the crushed ore is delivered from the crushers or sizers, the feed-box being arranged along the upper or raised side of the table at a point adjacent to the end to which is connected the reciprocating mechanism or mechanism employed to impart the reciprocatory movements to the table. It is also the usual custom to supply wash-water to the surface of the table from a suitable supply pipe arranged along the same side of the table, the wash-water being supplied from a point adjacent to the feed-box all the way to the end of the table.

Concentrating tables to be effective and especially in handling large volumes of ore, are required to be of considerable length as well as of considerable breadth, and reciprocatory movements of a high rate of speed are imparted to the table. Especially in the case of long, wide and heavy tables these rapid reciprocatory movements to which the table and its frame are subjected tend to work the parts of the frame of the table loose, thereby rapidly injuring if not destroying the framework of the table, and when the parts of the framing of the table become loose and worn, any attempt to tighten the same up by connecting bolts or rods has the effect of causing the table surface to buckle, which is detrimental to the efficient operation of the table in effecting ore concentration, and the repair of the looseness in the framework by the substitution of new parts necessitates shutting down of the machine and taking the same apart, thereby throwing the same out of commission.

It is among the special purposes of my present invention to provide an efficient bracing of the framework upon which the table top or surface is supported, whereby the table framework is strengthened to enable it to withstand the strains imposed thereon incidental to the reciprocatory movements imparted thereto, while at the same time the weight of the table is much less than is ordinarily required.

Referring to the drawings, reference sign A designates generally the table top, and B designates generally the mechanism for imparting reciprocatory movements thereto. In the particular form shown, to which, however, my invention is not limited, the upper and lower sides or edges of the table are parallel to each other and the ends of the table are parallel to each other, but inclined with respect to the sides or edges of the table, thereby producing a somewhat diamond-shaped outline; and the reciprocating mechanism B is connected to the table at one of the corners thereof and in a manner to impart reciprocations to the table on a line in the general direction of the shorter diagonal line of the table. The specific construction of the reciprocating mechanism forms no part of my present invention and the same may be varied throughout a wide range without departure from the spirit or scope of my invention. I have shown a reciprocating mechanism embodying a shaft C, having a crank, D, thereon, and adapted to be driven through pulleys, E, from any suitable or convenient source. A pitman F, is actuated by the crank D, and is suitably connected at its free end to a rocking arm G. The manner of connecting the pitman F and rocking arm G, in the specific details thereof, is not of the essence of my present invention, and therefore the same has not been specifically illustrated.

The frame of the table is made up of the end pieces H J, and side pieces K L. Bars or beams M N, are arranged to extend from one corner of the table to the diagonally opposite corner along the line of shortest diagonal distance of the table, and it is in the direction of the length of these beams that the reciprocatory movements are imparted to the table. On the upper side of these center beams M N, are arranged parallel beams O, connecting the end piece H with the side piece L, and similarly below the center beams M N are arranged parallel beams P, connecting the end piece J with the side piece K. Thus it will be seen that the beams M, N, O, P are all parallel with each other and with the line of reciprocatory movements imparted to the table. At suitable points spacing blocks or pieces Q, R, are arranged transversely of the table and interposed between adjacent longitudinal beams M, N, O, and P. The spacing blocks Q, R, are suitably secured so as to efficiently maintain the longitudinal beams spaced apart, as shown. In this manner I provide an exceedingly simple but efficient, strong and durable construction of framework for the table and one which is comparatively light, but capable of withstanding the shock incidental to the reciprocatory movements imparted to the table. Upon the framework of the table, constructed as above explained, is placed the flooring of the table top, indicated by reference sign S, which may be of any suitable or convenient construction and material, a merely conventional form of table top being indicated in the drawing. Upon the upper surface of the table top or floor, S, is placed ordinarily a linoleum lining, T, in the usual manner, and upon the upper surface of the linoleum lining the riffles, indicated generally by reference sign W, (see Fig. 1) are placed. The table and frame is arranged to rest upon transverse rollers A'. These rollers are preferably hollow tubes in order to reduce the weight, and any desired or desirable number may be employed. In practice I arrange a transverse supporting roller A' underneath each row of spacing blocks Q, though it is obvious that these supporting rollers may be arranged at any other suitable or convenient point. These rollers are arranged to rest upon suitable supporting beams B', to form a rolling bearing for the table. If desired, wearing plates C' D' (see Fig. 7) may be interposed between the bearing surfaces of the rollers and their supporting beams B' and the frame blocks Q. At their ends the rollers A' are reduced, as indicated at T', thereby forming a shouldered end surface, U', in the rollers, these end surface shoulders being arranged to abut against stop blocks E', the latter being bolted or otherwise secured upon the supporting beams B'. In this manner, longitudinal movement of the rollers is prevented. The stop blocks E' are suitably hollowed out, as indicated at F', (see Fig. 6) and in dotted lines in Fig. 7, so as to permit slight lateral movement of the rollers, but the walls of the hollowed out portion of the stop blocks E' form stops to prevent the rollers from being moved or shifted laterally in their rolling movement any farther than is permitted by the mechanism which imparts the reciprocatory movements to the table. If desired, the supporting beams B' may be tied together at their ends in any suitable manner, as, for instance, by channel beams G'. If desired, and in order to still further brace the parts which constitute the support for the reciprocating table, rods or struts, H', may be employed to tie the ends of the roller supporting beams, B', together. The supporting beams B' are in turn supported upon cradles J', to which said supporting beams may be clamped, and these cradles I prefer to place at points immediately below the center line of reciprocation. The cradles are curved on their under surface, as clearly indicated in Fig. 5, and rest or are supported upon the upper similarly curved surface of brackets K', the latter being supported upon supporting beams, such, for instance, as channel bars L'. The curved surfaces of cradles J' and brackets K' are preferably struck from a common center coinciding with the center line of reciprocation and in the longitudinal geometric central line of the space between center beams M N. By this arrangement the angle of inclination of the upper table top surface may be adjusted, changed or varied as may be required or desired, according to the character of the ore being operated upon, without disturbing the relative positions and connections of the mechanism employed to reciprocate the table.

If desired, and in order to prevent the reciprocating movements of the table being imparted to the supporting beams B', and in order to hold the supporting beams B' against lateral movement, one or more of the brackets K' may be provided with side pieces or guides R³, arranged to engage the sides of its coöperating cradle J', as clearly shown in Fig. 7. The supporting beams L' may be supported upon any suitable or convenient masonry, concrete or other support on the mill floor M'. Usually the mill floor is inclined as shown in the drawings in Figs. 3 and 4, in order that the water employed in plants in which ore concentrating tables are used may quickly drain off. It is usual, however, to support the beams L' substantially level.

The adjustments of the inclination of the table may be effected in any suitable, simple, or convenient manner. In the case of a diagonal table, that is, a table having a general diamond-shaped outline, as above explained, and of the type illustrated wherein reciprocatory movements are imparted in the direction of the length of the shorter diagonal line of said table, the inclination adjustment of the table is made with reference to the geometric shorter diagonal line of the table as an imaginary axis, and consequently the adjusting blocks are placed beneath and adjacent to the extreme corners of the table of the longer diagonal line thereof. In the particular form shown, to which, however, my invention is not limited or restricted, I employ at the respective diagonally opposite upper and lower corners of the table oppositely presented wedge blocks N' O', (see Fig. 4), suitably connected together by a rod or bar P', whereby said wedge blocks move in unison with each other. Adjusting movement may be imparted to the wedge blocks in any suitable or convenient manner. I have shown a yoke Q', connected to one of the wedge blocks, or to the end of the connecting rod or bar P', and with which coöperates a threaded rod R', provided with an operating handle S', whereby by turning said handle in one direction or the other the wedge blocks N' O' are adjusted in one direction or the other and in unison. In practice, I prefer to place the adjusting screw R', and its operating handle or wheel S', adjacent to the extreme lower corner of the table, for the reason that the attendant observes the separating effect or concentrating action at that point, and by controlling the means employed for adjusting the inclination of the table at that point such means may be controlled by the attendant while at the same time observing the effect of such adjustment upon the ore being treated or upon the separating or concentrating effect of the table, whereas if the means for controlling the angular adjustment of the table were located at the diagonally opposite or at the head motion end of the table, then the attendant would be too far away from the point where the effect of the adjustment can be noted to enable him to observe the effect of the adjustment, and this I regard as an exceedingly convenient and desirable feature of my invention. By arranging the wedge blocks N' O' to present in opposite directions it will be seen that simultaneously with the withdrawal of one of the wedge blocks the other is advanced, thereby proportionately raising the one corner of the table and lowering the other.

In the practical operation of ore concentrating tables to which reciprocatory movements of a high rate of speed are imparted the beams of the table framework which are arranged in the direction of the reciprocatory movements are subjected by the mechanism which imparts the reciprocatory movement, either with or without the use of springs in association therewith, to both compressing and also to tension strains. The compressing strains to which the table is thus subjected, whether produced by the reciprocating mechanism or by the resistance springs, are objectionable, in that they tend to cause bending or buckling of the frame beams or of the table. It is among the special purposes of my present invention to avoid this objection and to provide means whereby the frame beams and the table are constantly maintained under longitudinal tension, thereby avoiding the danger of buckling or bending under the influence of compressing strains. This danger and objection is present in a more marked degree in tables in which the reciprocating mechanism employs a spring arranged at the head motion end of the table to take up lost motion, because in such event the table is subjected to a high rate of alternation of the compressing and tension strains, thereby causing the parts of the frame to become rapidly loosened and hence injuring if not destroying the table, requiring frequent renewals of parts and often reconstruction of the entire table. In accomplishing my object, I impose upon the table or upon the longitudinal frame beams thereof a constant longitudinal strain or tension. This may be accomplished in many specifically different ways, and while therefore I have shown and will now describe one construction embodying the principles of the invention, I do not desire to be limited or restricted to the specific construction and arrangement thereof as disclosed.

Referring to the drawings, and particularly to Figs. 2, 3, 8 and 9, reference sign $A^2$ designates an arm pivotally mounted at one end thereof to a suitable stud or pin, $B^2$, upon a convenient part of the framework. At its free end the arm $A^2$ is provided with a bearing seat, $C^2$, arranged to receive the end of a strong coiled spring, $D^2$. The opposite end of said spring is arranged to bear against the up-turned end or wall $E^2$ of a bracket adjustably mounted so as to adjust the distance between said up-turned end $E^2$ and arm $A^2$. Any suitable or convenient form of adjustment may be employed for this purpose. As shown, a rod or bolt, $F^2$, is connected to the bracket and is arranged to pass loosely through a block, $G^2$, and to receive set-nuts $H^2$, whereby the proper adjustment of the bracket may be effected in a well understood manner. On its outer face the free end of rocking arm $A^2$ is provided with an enlarged bearing seat, $J^2$, arranged to bear against a projection, $K^2$, of a bracket or casting $L^2$, suitably bolted to the beams M N, (see Fig. 9). The bearing seat $J^2$ should be of sufficient area or size, and the lug or projection $K^2$ of such suitable exterior contour as to enable the inclination adjustments of the table as above explained, without the engaging lug or projection $K^2$ binding in its seat in the outer face of rocking arm $A^2$. The engagement of the lug or projection $K^2$ in the bearing seat of rocking arm $A^2$, also serves to prevent the table from slipping sidewise or laterally when it is adjustably inclined.

From the foregoing description it will be seen that the tension of spring $D^2$ is exerted on rocking arm $A^2$ in a direction to press said arm outwardly or in the direction of the concentrates discharge end of the table, and by suitably adjusting the bearing bracket $E^2$ of the spring its tension may be regulated. In practice I prefer to form the bearing surface of lug or projection $K^2$, against which the free end of rocking arm $A^2$ bears, somewhat convexed or curved, as most clearly shown in Fig. 8, the curvature thereof being struck from a center lying in the geometric central line of the space between the frame beams M N, and the bearing of rocking arm G against the table at the opposite end of the latter is similarly curved or convexed and from a center lying in the same line.

It will be observed from the foregoing description that the table is constantly stretched, so to speak, between the bearing points of arms G and $A^2$, which bearing points lie in the geometric center line of the space between the longitudinal frame beams M N, the bearing of lever G engaging the table to move the same to the left, for instance, as shown in Fig. 3, while the bearing of arm $A^2$ against the table at its opposite end is in a direction to move the table to the right as viewed in Fig. 3. While, therefore, the actuating arm G is free when rocked in one direction to leave its engagement with the table, the tension of spring $D^2$ at the opposite end of the table operating thereon through the arm $A^2$, causes the table to follow up the rocking movement of arm G, and similarly when a pull is exerted on arm G by the reciprocating mechanism to move the table to the left as viewed in Fig. 3, the spring $D^2$ is pressed by the pull of the reciprocating mechanism acting through the table and the beams M N thereof and casting $L^2$, with its stud or projection $K^2$, bearing against rocking arm $A^2$, and it will also be seen that this line of pull is in the geometric line above mentioned, and hence it will be seen that the framework of the table is under a constant pulling or stretching tension, thereby preventing the frame pieces from working loose during the operation of the machine and enabling the machine to be operated for a longer length of life and avoiding the necessity for frequent repairs, renewals or reconstruction and constantly taking up any lost motion of the parts, and avoiding buckling or adjustments necessary to take up looseness of the parts.

It will be noted that the longitudinal beams M N are respectively in one piece from end to end, and this I find to be a desirable feature of my invention, although it is obvious that variations may be made in the manner of constructing and arranging the connections between the ends of the table, without departure from the spirit and scope of my invention.

It will be seen that the rocking arms G and A², are disconnected from the table except for a lateral bearing thereagainst, therefore the entire table and its framework may be bodily raised from or lowered upon the supporting structure of the table and the rocking arms and will readily adjust itself when lowered into proper operating position with reference to the rocking arms, thus enabling compensation to be made for any slight inequalities of workmanship in turning out the parts.

In the practical operation of ore concentrating tables the crushed ore is delivered ordinarily to a feed-box, and from thence to the table surface through openings in the wall or bottom of the feed-box. Ordinarily the material is delivered along with water. Usually the feed-box is supported upon the table along its upper side or edge. The discharge of the water and ore from the feed-box and upon the table surface, and especially in case there is any considerable fall or head, causes the material to be forced to a considerable distance transversely of the table from the feed-box, thereby leaving an appreciable area of the table surface which performs no useful work in the concentrating operation. In order to avoid this objection and to utilize all the available working face or surface of the table, I provide a deflector plate and arrange the same in position to conduct the material delivered from the feed-box along with the water to the extreme upper edge or side of the table and by which the material is compelled to traverse the entire working surface of the table.

In the drawings, reference sign P² designates the feed-box into which the material is delivered and from which such material is delivered to the table surface through the openings Q²; and R² designates the deflector plate arranged to extend into position to catch the material delivered through openings Q², and to deflect the same backwardly and so as to reach the table surface at its extreme upper edge or side. In practice, the larger particles or portions of mineral value delivered from the crushers or sizers into the feed-box, P², by reason of their greater weight are inclined to settle to the bottom of the feed-box and if delivered from the feed-box upon the table they are more readily acted upon by the water, which tends to impart a rolling motion thereto, thereby rendering it liable to carry such larger mineral particles transversely across the table along with the rock and over the tailings discharge edge or side of the table, thereby losing these valuable particles. It is the special purpose of another feature of my invention to provide against the loss thus occurring and I accomplish this object by providing the feed-box with a plate or board, A³, placed in the bottom thereof, and upon the upper surface of which plate or board are secured ribs or riffles B³, arranged to terminate flush with the edge of said board. The board is somewhat less in width than the transverse width of the feed-box, as most clearly shown in Fig. 5, thus leaving along the upper or outer edge of the feed box a channel or groove, C³. The riffles or ribs B³ are arranged in substantially parallel relation with respect to each other and inclined or diagonal with respect to the feed-box. At the end of the feed-box farthest removed from the feed end of the table I provide an opening, D³, through which the groove or opening C³ discharges and the area of which opening, if desired, may be suitably regulated by a slide plate, E³, or in any other simple, suitable or convenient manner. In practice I prefer to arrange the bottoms of the discharge opening Q² of the feed-box on a line with or slightly above the upper surfaces of the ribs or riffles B³, in order to permit any heavy or large mineral particles to settle down into the bottom of the box and to be separated or concentrated therein and discharged therefrom through the end openings D³. In this manner I not only avoid the danger of losing the heavier and valuable particles of the mineral values by having the same washed across the table with the tailings under the rolling motion due to the action of the wash or supply water thereon, but a preliminary concentration takes place in the feed-box itself. The mineral values thus concentrated in the feed-box may be collected from the discharge opening in the end of the feed-box, or, if desired, may be delivered therefrom upon the table surface or otherwise collected and saved or conducted away, as will be readily understood. If desired, the riffles or ribs employed in the feed-box may be made to slightly taper in height in the direction of the length thereof.

In the practical operation of ore concentrating tables there is usually a portion or certain amount of the very fine mineral particles which are held in suspension in the feed-water. Another class of fine particles are somewhat heavier than the floating particles above referred to and which are held in suspension, and the particles of this latter mentioned class, being heavier, quickly settle to the surface of the table when the crushed ore is delivered upon the table surface and under the influence of the table action are carried forward toward the front end of the machine along the riffles. In order to avoid the possibility of waste of the fine particles which are held in suspension in the feed-water by the water carrying such fine particles quickly across the surface of the table and over the discharge edge, it is desirable that the material when delivered upon the surface of the table be spread out over a comparatively large area of the table surface. Therefore I propose to omit some of the riffles from the surface of the table adjacent to the feed supply edge thereof, thereby enabling the material supplied to the table surface to spread out. This spreading out of the material supplied to the table is important, in that there is quickly formed a bank of sand, silica or other material adjacent to the feed end of the table, which serves to retard the flow of the feed water transversely across the table sufficiently to enable the finer float particles of mineral values to be caught by the bed of sand and to settle down thereon, and I have found that these float particles of mineral values are more readily caught and retained by an evenly spread out bed of sand or silica than by a riffled surface which causes agitation of the water flowing thereover. It is important, however, to provide means whereby the silica bed thus formed may not be continually and unduly augmented or increased as the feed continues, and consequently it is desirable to provide means whereby this bed or any portion thereof may along with the feed-water escape from the table surface and at the discharge side or edge of the table, and hence also to prevent the silica or sand from the bed or bank from being advanced with the table action to the front end of the table where it may not become mixed with the concentrates. In accomplishing this object, however, it is important to provide against such a discharge of the bed of silica along with the feed-water as would tend to carry along with it any mineral values. Therefore in carrying out my invention I propose to provide a restricted discharge opening at the tailings discharge edge of the table. This idea may be carried into practical operation in many different ways. I have shown a simple way of accomplishing the desired object, wherein I suitably curve or bend the extreme ends of the riffles backwardly or toward the feed end of the table, as indicated at G³, at the discharge edge or side of the table so as to restrict the opening between each riffle at its extreme end thereof and the next riffle above the same. As before stated, however, this restriction in the discharge opening between these ends of the riffles may be accomplished in other ways.

The wash-water may be supplied to the table surface in any suitable manner, as, for instance, from a feed pipe, H³.

Many variations in the details of construction and arrangement would readily occur to persons skilled in the art and still fall within the spirit and scope of my invention. I do not desire, therefore, to be limited or restricted to the exact details of construction and arrangement shown and described. But Having now set forth the objects and nature of my invention and a construction embodying the principles thereof, what I claim as new and useful and of my own invention, and desire to secure by Letters Patent, is:

1. The combination with a table and means connected to one end thereof for moving the same in one direction, a pivoted arm arranged to bear against the table at the opposite end thereof in a direction to move said table in the opposite direction, a spring arranged to bear against said arm, and means for adjusting the tension of said spring, as and for the purpose set forth.

2. The combination with a table, of means connected to one end thereof for moving the same in one direction, of a casting connected to the table at the opposite end thereof and provided with a bearing projection or stud, a rocking arm arranged to bear against said projection or stud, a bracket, and a spring interposed between said bracket and arm as and for the purpose set forth.

3. The combination with a table and means connected to one end thereof for moving the same in one direction, of a casting connected to the table at the opposite end thereof, and provided with a stud or projection, a rocking arm having a guiding seat arranged to receive said stud or projection and to form a bearing thereagainst, and a spring arranged to exert its tension upon said arm to rock said arm to move said table in the opposite direction, as and for the purpose set forth.

4. The combination with a table, rocking arms arranged at opposite ends thereof to freely bear against said table in opposite directions, actuating mechanism for rocking one of said arms, and a spring arranged to exert its tension upon the other of said arms, whereby the table is constantly maintained under tension during the operation thereof, as and for the purpose set forth.

5. The combination with a table having suitably spaced parallel frame beams, pivotally mounted arms arranged at the respective ends of said table and having bearing connection in opposite directions with said table in the geometric central line of the space between said beams, mechanism for positively rocking one of said arms, and a spring arranged to exert its tension against the other of said arms, as and for the purpose set forth.

6. A feed-box for concentrating tables having discharge openings through the side thereof, and an auxiliary discharge opening in the end thereof, in combination with a plate or board arranged in the bottom of the feed box but of less width than the width of the feed-box and having riffles upon the upper surface thereof, said side discharge openings being above the upper surface of said plate or board, as and for the purpose set forth.

7. The combination with a feed-box for concentrating tables having side discharge openings and an end discharge opening, a plate or board arranged in the bottom thereof, but of less width than the width of said box, thereby forming a channel, said channel communicating with said end discharge opening, and riffles arranged upon the upper surface of said plate or board, as and for the purpose set forth.

8. A reciprocable concentrating table having riffles upon the upper surface thereof, and arranged to extend from the tailings discharge edge toward the concentrates discharge end of the table, in combination with means for limiting the space between the ends of the riffles at the tailings discharge edge of the table, as and for the purpose set forth.

9. A concentrating table having riffles upon the upper surface thereof, and arranged to extend from the tailings discharge edge toward the concentrates discharge end of the table, the ends of said riffles which terminate at the tailings discharge edge of the table being curved or bent toward the next adjacent riffle, whereby the space between the riffles is restricted, as and for the purpose set forth.

In witness whereof, I have hereunto set my hand this tenth day of January 1903, in the presence of the subscribing witnesses.

GUSTAVE A. OVERSTROM.

Witnesses:
    CHAS. H. SEEM,
    S. E. DARBY.